US012620296B2

(12) United States Patent
Hevdeli et al.

(10) Patent No.: US 12,620,296 B2
(45) Date of Patent: May 5, 2026

(54) OCCUPANCY DEPENDENT FALL DETECTION

(71) Applicant: Essence SmartCare Ltd., Herzlia Pituach (IL)

(72) Inventors: Ilan Hevdeli, Ganei-Tikva (IL); Jonathan Mark Schnapp, Tel Aviv (IL)

(73) Assignee: ESSENCE SECURITY INTERNATIONAL (E.S.I.) LTD., Herzlia Pituach (IL)

( * ) Notice: Subject to any disclaimer, the term of this patent is extended or adjusted under 35 U.S.C. 154(b) by 153 days.

(21) Appl. No.: 18/571,098

(22) PCT Filed: Jun. 15, 2022

(86) PCT No.: PCT/IL2022/050644
§ 371 (c)(1),
(2) Date: Dec. 15, 2023

(87) PCT Pub. No.: WO2022/264143
PCT Pub. Date: Dec. 22, 2022

(65) Prior Publication Data

US 2024/0290189 A1 Aug. 29, 2024

(30) Foreign Application Priority Data

Jun. 16, 2021 (GB) ...................................... 2108554

(51) Int. Cl.
*G08B 21/04* (2006.01)
*G08B 25/00* (2006.01)

(52) U.S. Cl.
CPC ....... *G08B 21/043* (2013.01); *G08B 21/0469* (2013.01); *G08B 21/0492* (2013.01); *G08B 25/001* (2013.01)

(58) Field of Classification Search
CPC .............. G08B 21/043; G08B 21/0469; G08B 21/0492; G08B 25/001; G08B 29/186;
(Continued)

(56) References Cited

U.S. PATENT DOCUMENTS 9,141,852 B1 9/2015 Cosgun et al.
10,231,647 B2 * 3/2019 Kostic .................. A61G 7/0527
(Continued)

FOREIGN PATENT DOCUMENTS

WO 2016155789 A1 10/2016
WO 2022264143 A2 12/2022

OTHER PUBLICATIONS

Foreign Communication from a Related Counterpart Application, International Preliminary Report on Patentability dated Dec. 14, 2023, International Application No. PCT/IL2022/050644 filed on Jun. 15, 2022.

*Primary Examiner* — Curtis J King
(74) *Attorney, Agent, or Firm* — Conley Rose, P.C.

(57) ABSTRACT

One embodiment relates to computer implemented method comprising: controlling an active reflected wave detector to measure wave reflections from an environment to receive measured wave reflection data that is obtained by the active reflected wave detector; determining an occupancy level indicative of how many people are present in the environment; and controlling, in dependence on the occupancy level, a fall detector that is operable to detect whether a person in the environment has fallen based on the measured wave reflection data.

18 Claims, 8 Drawing Sheets

(58) Field of Classification Search
CPC .. G08B 21/0476; A61B 5/1117; A61B 5/1115
See application file for complete search history.

(56) References Cited

U.S. PATENT DOCUMENTS

2011/0241886 A1* 10/2011 Receveur .............. A61B 5/1115 340/573.4
2012/0050049 A1 3/2012 Quinones Caballero
2012/0147705 A1* 6/2012 Hick .................... H05B 47/115 367/93
2012/0313588 A1* 12/2012 Carberry .................. F24F 11/30 320/134
2012/0314901 A1* 12/2012 Hanson ................ G08B 21/043 600/595
2016/0300468 A1* 10/2016 Stricker ................. G08B 21/02
2018/0012467 A1* 1/2018 Chen .................. G08B 13/2494
2019/0094350 A1* 3/2019 Baheti ..................... G01S 7/415
2019/0139390 A1* 5/2019 Kawazu ............... G08B 21/043
2019/0267136 A1* 8/2019 Lord, IV ................. G06F 9/546
2019/0287682 A1* 9/2019 Van Zon ................ G16H 50/30
2020/0166610 A1* 5/2020 Lin ..................... G01S 13/0209
2020/0289033 A1* 9/2020 Sivertsen ............. A61B 5/7275
2021/0057101 A1* 2/2021 deSa ........................ G08B 7/06
2021/0103044 A1* 4/2021 Droitcour ............. G01S 13/581
2021/0209927 A1* 7/2021 Hedges ................ G08B 25/005
2021/0245763 A1* 8/2021 Gomez ................. G01S 7/2883
2022/0148405 A1* 5/2022 Nakabayashi ......... A61B 5/024
2022/0180723 A1* 6/2022 Cheng ..................... G01S 13/62
2022/0358822 A1* 11/2022 Nakabayashi ..... G07C 9/00182
2023/0008729 A1* 1/2023 Ko .......................... G01S 13/89
2023/0018686 A1* 1/2023 Shin ....................... A61B 5/747
2023/0078905 A1* 3/2023 Cheng .................. G06N 3/0464 340/573.1
2023/0087854 A1* 3/2023 Yu ......................... G06F 3/0481 367/117
2023/0140093 A1* 5/2023 Cheng ...................... G06N 3/09 340/573.1
2023/0181059 A1* 6/2023 Orlovsky ................ G01S 13/88 600/407
2023/0393269 A1* 12/2023 Steiner ................ G01S 7/52001
2024/0210553 A1* 6/2024 Meger ..................... G01S 7/414
2024/0219549 A1* 7/2024 Henze ..................... G01S 13/82
2024/0280695 A1* 8/2024 Tanigawa ............... G06Q 10/04
2024/0402335 A1* 12/2024 Xiang ..................... G01S 15/04

* cited by examiner

OCCUPANCY DEPENDENT FALL DETECTION

RELATED APPLICATION/S

This application claims the benefit of priority of Great Britain Patent Application No. 2108554.3 filed on 16 Jun. 2021, the contents of which are incorporated herein by reference in their entirety.

TECHNICAL FIELD

The present invention relates generally to a device and method for controlling a fall detector.

BACKGROUND

There is a need to use a monitoring system to automatically detect when a person has fallen in a designated space, for example in an interior of a building. For example, an elderly person may end up in a hazardous situation when they have fallen and are unable to call for help, or unable to do so quickly.

Some known systems have been developed in which the person wears a pendant which has an accelerometer in it to detect a fall based on kinematics. The pendant upon detecting a fall can transmit an alert signal. However the person may not want to wear, or may be in any case not wearing, the pendant.

Other reflected-wave based systems such as radar (whether radio wave, microwave or millimeter wave), lidar or sonar, are known to monitor a person in a designated space.

SUMMARY

The inventors have identified that the known reflected-wave based systems consume significant power, which presents a challenge to its viability in applications in which low power consumption is a key requirement.

The inventors have recognised that in situations where multiple people are present in an environment, power can be conserved by controlling the operation of a reflected-wave based fall detector. This is based on knowing that there are other people in the vicinity of the person who has fallen who can take action to help (e.g. make a telephone call or push a distress button if needed), and thus the device can save power by not performing a power intensive operation.

According to one aspect of the present disclosure there is provided a computer implemented method comprising: controlling an active reflected wave detector to measure wave reflections from an environment to receive measured wave reflection data that is obtained by the active reflected wave detector; determining an occupancy level indicative of how many people are present in the environment; and controlling, in dependence on the occupancy level, a fall detector that is operable to detect whether a person in the environment has fallen based on the measured wave reflection data.

If the occupancy level indicates that only a single person is present in the environment, the method may comprise controlling the fall detector to detect whether the single person has fallen based on the measured wave reflection data.

The method may further comprise controlling the issuance of a fall detection alert in response to the fall detector detecting that the person has fallen.

The method may comprise commencing a fall detection process if the occupancy level indicates that a single person is present in the environment, whereas if the occupancy level indicates that multiple people are present in the environment it may be that no fall detection process is commenced—in other words, a fall detection process is prevented from being commenced. The fall detection process commenced if the occupancy level indicates that a single person is present in the environment and the fall detection process that is not commenced if the occupancy level indicates that multiple people are present in the environment, may comprise operating the active reflected wave detector to collect wave reflection data, and determining from collected wave reflection data whether a fall has occurred.

If the occupancy level indicates that multiple people are present in the environment, the method may comprise preventing commencement of a fall detection process performed by the fall detector.

If the occupancy level indicates that multiple people are present in the environment, the method may comprise aborting a fall detection process performed by the fall detector.

For example, in a fall detection process that comprises operating the active reflected wave detector to collect wave reflection data and determining from collected wave reflection data whether a fall has occurred, aborting the fall detection process may comprise any one or more of:

- aborting operating the active reflected wave detector to thereby stop collecting wave reflection data sufficient for determining whether a fall has occurred;
- operating the active reflected wave detector to collect wave reflection data sufficient for determining whether a fall has occurred but not determining from the collected wave reflection data whether a fall has occurred; or
- operating the active reflected wave detector to collect wave reflection data sufficient for determining whether a fall has occurred and aborting a process of determining from collected wave reflection data whether a fall has occurred.

Optionally a duration of operating the active reflected wave detector to collect wave reflection data sufficient for determining whether a fall has occurred may be a predetermined amount time.

If the occupancy level indicates that multiple people are present in the environment, the method may comprise preventing the issuance of a fall detection alert in response to the fall detector detecting that a person in the environment has fallen. For example, in an embodiment in which the method comprises issuing a fall detection alert in response to the fall detector detecting that a person in the environment has fallen, the method may comprise not issuing the fall detection alert if the occupancy level indicates that multiple people are present in the environment.

In an embodiment in which the method comprises issuing a first type of fall detection alert in response to the fall detector detecting that a person in the environment has fallen, the method may comprise issuing a second type of fall detection alert, different to the first type of fall detection alert, if the occupancy level indicates that multiple people are present in the environment, and the fall detector detects that a person in the environment has fallen. The second type of fall detection alert may be issued instead of the first type of fall detection alert.

The first type of fall detection alert may indicate that a single people is present in the environment, or provides no information on how many people are present in the environment.

The determining the occupancy level may be based on the measured wave reflection data.

Determining the occupancy level may be based on a spatial distribution of reflection points conveyed in the measured wave reflection data.

The method may further comprise determining the occupancy level to indicate that multiple people are present in the environment if the spatial distribution of reflection points exceeds a spatial distribution threshold.

The method may comprise clustering reflection points conveyed in the measured wave reflection data into a number of clusters, and said determining the occupancy level may be based on the number of clusters.

The method may further comprise determining the occupancy level to indicate that multiple people are present in the environment if the clustering clusters the reflection points conveyed in the measured wave reflection data into multiple clusters.

The method may comprise clustering reflection points conveyed in the measured wave reflection data into a cluster, and said determining the occupancy level may be based on a spatial size of said cluster. The method may further comprise determining the occupancy level to indicate that multiple people are present in the environment if the size of said cluster exceeds a cluster size threshold.

The method may comprise supplying the measured wave reflection data as an input into a trained occupancy classifier, and determining the occupancy level based on a classification result output by the occupancy classifier.

The trained occupancy classifier may be trained with a plurality of datasets, the plurality of datasets comprising (i) one or more datasets associated with an environment comprising a single person; and (ii) one or more datasets associated with an environment comprising multiple people.

The method may further comprise: receiving a first sensor signal from a first activity sensor configured to detect activity in a first region of the environment; receiving a second sensor signal from a second activity sensor configured to detect activity in a second region of the environment that does not overlap with the first region; and determining the occupancy level using both the first sensor signal and the second sensor signal.

At least one of the first activity sensor and the second activity sensor may be a motion detector (e.g. a passive infrared detector.

The method may further comprise: controlling a camera to capture one or more images of the environment; and determining the occupancy level based on processing the one or more captured images.

The method may further comprise: controlling a microphone to capture audio from the environment; and determining the occupancy level based on processing the captured audio.

If the occupancy level indicates that multiple people are present in the environment, the method may comprise controlling the active reflected wave detector to operate in an operating mode in which it does not measure wave reflections from the environment.

The controlling the active reflected wave detector to measure wave reflections from the environment may be performed in response to detecting motion in the environment based on receiving motion detection data from a motion detector.

The controlling the active reflected wave detector to measure wave reflections from the environment is performed upon expiry of a time window that commences in response to the motion sensor detecting motion of a person.

The active reflected wave detector may be a radar sensor or a sonar sensor.

According to another aspect of the present disclosure there is provided a computer-readable storage medium comprising instructions which, when executed by a processor of a fall detection device cause the processor to perform the method steps of one or more embodiments described herein.

The instructions may be provided on one or more carriers. For example there may be one or more non-transient memories, e.g. a EEPROM (e.g. a flash memory) a disk, CD- or DVD-ROM, programmed memory such as read-only memory (e.g. for Firmware), one or more transient memories (e.g. RAM), and/or a data carrier(s) such as an optical or electrical signal carrier. The memory/memories may be integrated into a corresponding processing chip and/or separate to the chip. Code (and/or data) to implement embodiments of the present disclosure may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language.

According to another aspect of the present disclosure there is provided a fall detection device comprising: a processor, wherein the processor is configured to: control an active reflected wave detector to measure wave reflections from an environment to receive measured wave reflection data that is obtained by the active reflected wave detector; determine an occupancy level indicative of how many people are present in the environment; and control, in dependence on the occupancy level, a fall detector that is operable to detect whether a person in the environment has fallen based on the measured wave reflection data.

The processor may be configured to perform any of the methods described herein

The device may further comprise the active reflected wave detector.

These and other aspects will be apparent from the embodiments described in the following. The scope of the present disclosure is not intended to be limited by this summary nor to implementations that necessarily solve any or all of the disadvantages noted.

BRIEF DESCRIPTION OF THE SEVERAL VIEWS OF THE DRAWINGS

For a better understanding of the present disclosure and to show how embodiments may be put into effect, reference is made to the accompanying drawings in which.

DETAILED DESCRIPTION

Figure 1:
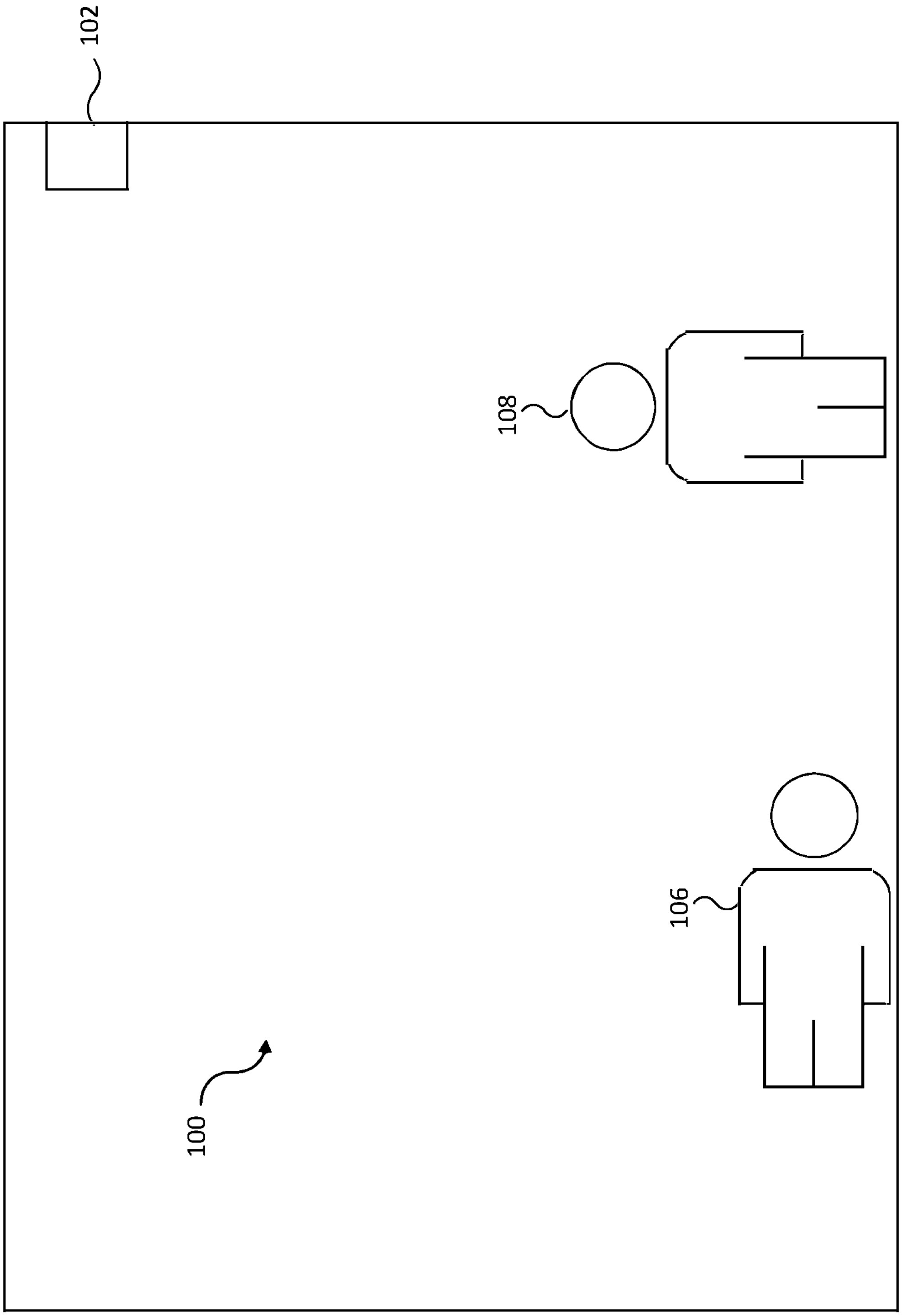
FIG. 1 illustrates an environment in which a device has been positioned.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized, and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims and their equivalents. In the following embodiments, like components are labelled with like reference numerals.

In the following embodiments, the term data store or memory is intended to encompass any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., EEPROM, solid state drives, random-access memory (RAM), etc.), and/or the like.

As used herein, except wherein the context requires otherwise, the terms "comprises". "includes", "has" and grammatical variants of these terms, are not intended to be exhaustive. They are intended to allow for the possibility of further additives, components, integers or steps.

The functions or algorithms described herein are implemented in hardware, software or a combination of software and hardware in one or more embodiments. The software comprises computer executable instructions stored on computer readable carrier media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor.

Specific embodiments will now be described with reference to the drawings.

FIG. 1 illustrates an environment 100 in which a device 102 has been positioned (e.g. mounted to a wall or ceiling). The environment 100 may for example be an indoor space such as a room of a home, a nursing home, a public building or other indoor space. Alternatively the environment may be an outdoor space such as a courtyard or garden. The device 102 is configured to monitor the environment 100 in which a person or multiple persons may be present.

For illustration purposes only, FIG. 1 shows the environment comprising two people, person 106 and person 108. It will be appreciated that the environment may comprise a different number of people than that shown in FIG. 1.

The present invention relates to the detection of a person 106 having fallen (that is, being in a fall position) which is illustrated in FIG. 1, and controlling a fall detector of the device 102 in dependence on how many people are present in the environment.

Figure 2:
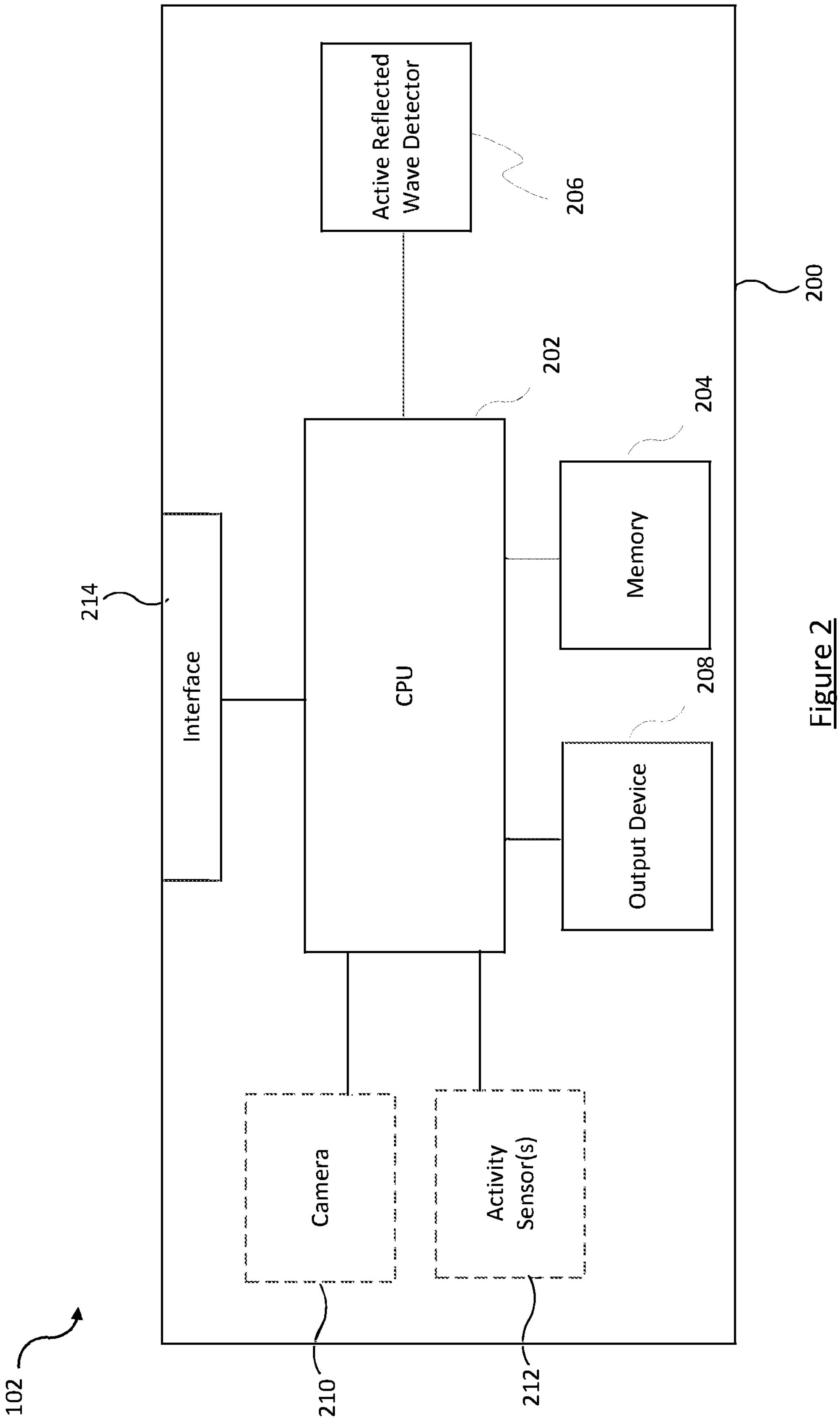
FIG. 2 is a schematic block diagram of the device.

FIG. 2 illustrates a simplified view of the device 102. A shown in FIG. 2, the device 102 comprises a central processing unit ("CPU") 202, to which is connected a memory 204. The functionality of the CPU 202 described herein may be implemented in code (software) stored on a memory (e.g. memory 204) comprising one or more storage media, and arranged for execution on a processor comprising one or more processing units. The storage media may be integrated into and/or separate from the CPU 202. The code is configured so as when fetched from the memory and executed on the processor to perform operations in line with embodiments discussed herein. Alternatively, it is not excluded that some or all of the functionality of the CPU 202 is implemented in dedicated hardware circuitry (e.g. ASIC(s), simple circuits, gates, logic, and/or configurable hardware circuitry like an FPGA. In other embodiments (not shown) a processing system executes the processing steps described herein, wherein the processing system may consist of the processor as described herein or may be comprised of distributed processing devices that may be distributed across two or more devices shown in the system 100. Each processing device of the distributed processing devices may comprise any one of more of the processing devices or units referred to herein.

FIG. 2 shows the CPU 202 being connected to an active reflected wave detector 206.

The CPU 202 may optionally also be connected to a camera 210 and/or one or more activity sensor 212. While in the illustrated embodiment the activity sensor(s) 212, active reflected wave detector 206, and the camera 210 are separate from the CPU 202, in other embodiments, at least part of processing aspects of the activity sensor(s) 212 and/or active reflected wave detector 206 and/or camera 210 may be provided by a processor that also provides the CPU 202, and resources of the processor may be shared to provide the functions of the CPU 202 and the processing aspects of the activity sensor(s) 212 and/or active reflected wave detector 206 and/or camera 210. Similarly, functions of the CPU 202, such as those described herein, may be performed in the activity sensor(s) 212 and/or the active reflected wave detector 206 and/or the camera 210.

As shown in FIG. 2, a housing 200 of the device 102 may house the activity sensor(s) 212, the active reflected wave detector 206, and the camera 210. Alternatively, the activity sensor(s) 212 may be external to the device 102 and be coupled to the CPU 202 by way of a wired or wireless connection. Similarly, the active reflected wave detector 206 may be external to the device 102 and be coupled to the CPU 202 by way of a wired or wireless connection. Similarly, the camera 210 may be external to the device 102 and be coupled to the CPU 202 by way of a wired or wireless connection. Further, the outputs of the activity sensor(s) 212 and/or active reflected wave detector 206 and/or camera 210 may be wirelessly received from/via an intermediary device that relays, manipulates and/or in part produces their outputs.

The activity sensor(s) 212 are each configured to detect activity in the environment. In implementations that use multiple activity sensors, the multiple activity sensors may detect activity in different regions of the environment (e.g. different rooms of a home, or more preferably a different regions of the same room).

One example activity sensor 212 is a motion sensor. In implementations using a motion sensor 212, the CPU 202 is configured to detect motion in the environment based on an output of the motion sensor. The motion sensor may be a passive infrared (PIR) sensor. The motion sensor is preferably a PIR sensor, however it could be an active reflected wave sensor, for example radar, that detects motion based on the Doppler effect. For example, the motion sensor may be a radar based motion sensor which detects motion based on the Doppler component of a radar signal. The activity sensor(s) 212 may include a microphone, a vibration sensor, and/or an infrared sensor. Other types of activity sensors are known to persons skilled in the art.

In an activated state, the active reflected wave detector 206 operates to measure wave reflections from the environment.

The active reflected wave detector 206 may operate in accordance with one of various reflected wave technologies. In operation, the CPU 202 uses the output of the active reflected wave detector 206 to determine the presence of a target object (e.g. human).

The active reflected wave detector 206 may be a ranging detector. That is, in contrast with Doppler-only detectors, the active reflected wave detector 206 may be configured to determine the location of an object (e.g. a person) in its field of view. This enables the CPU 202 to track the location of an object in the environment.

In some implementations, the active reflected wave detector 206 may provide both a ranging based output and a Doppler-based output based on measuring wave reflections from the environment. In these implementations, the active reflected wave detector 206 is configured to detect motion in a region in the environment, and a dedicated motion sensor 212 is not required.

Preferably, the active reflected wave detector 206 is a radar sensor. The radar sensor 206 may use millimeter wave (mmWave) sensing technology. The radar is, in some embodiments, a continuous-wave radar, such as frequency modulated continuous wave (FMCW) technology. Such a chip with such technology may be, for example, Texas Instruments Inc. part number iwr6843AOP. The radar may operate in microwave frequencies, e.g. in some embodiments a carrier wave in the range of 1-100 GHz (76-81 Ghz or 57-64 GHz in some embodiments), and/or radio waves in the 300 MHz to 300 GHz range, and/or millimeter waves in the 30 GHz to 300 GHZ range. In some embodiments, the radar has a bandwidth of at least 1 GHZ. The active reflected wave detector 206 may comprise antennas for both emitting waves and for receiving reflections of the emitted waves, and in some embodiment different antennas may be used for the emitting compared with the receiving.

As will be appreciated the active reflected wave detector 206 is an "active" detector in the sense of it relying on delivery of waves from an integrated source in order to receive reflections of the waves. The active reflected wave detector 206 is not limited to being a radar sensor, and in other embodiments alternative ranging detectors may be used, for example the active reflected wave detector 206 may be a LIDAR sensor, or a sonar sensor.

The active reflected wave detector 206 being a radar sensor is advantageous over other reflected wave technologies in that radar signals may transmit through some materials, e.g. wood or plastic, but not others—notably water which is important because humans are mostly water. This means that the radar can potentially "see" a person in the environment even if they are behind an object of a radar-transmissive material. Depending on the material, this may not be the case for sonar or lidar.

In operation, the active reflected wave detector 206 performs one or more reflected wave measurements at a given moment of time, and over time these reflected wave measurements can be correlated by the CPU 202 with the presence of a person and/or a state of the person and/or a condition of the person. In the context of the present disclosure, the state of the person may be a characterization of the person based on a momentary assessment. For example, a classification based on their position (e.g. in a location in respect to the floor and in a configuration which are consistent or inconsistent with having fallen) and/or their kinematics (e.g. whether they have a velocity that is consistent or inconsistent with them having fallen, or having fallen possibly being immobile). In the context of the present disclosure, the condition of the person may comprise a determination of an aspect of the person's health or physical predicament, for example whether they are in a fall condition whereby they have fallen and are substantially immobile, such that they may not be able (physically and/or emotionally) to get to a phone to call for help. In some embodiments this involves an assessment of the person's status over time, such as in the order of 30-60 seconds.

In some embodiments, the CPU 202 is configured to control the camera 210 to capture an image (represented by image data) of the environment. The camera 210 is preferably a visible light camera in that it senses visible light. Alternatively, the camera 210 senses infrared light. One example of a camera which senses infrared light is a night vision camera which operates in the near infrared (e.g. wavelengths in the range 0.7-1.4 μm) which requires infrared illumination e.g. using infrared LED(s) which is not visible to an intruder. Another example of a camera which senses infrared light is a thermal imaging camera which is passive in that it does not require an illuminator, but rather, senses light in a wavelength range (e.g. a range comprising 7 to 15 μm, or 7 to 11 μm) that includes wavelengths corresponding to blackbody radiation from a living person (around 9.5 μm). The camera 208 may be capable of detecting both visible light and, for night vision, near infrared light. The CPU 202 may comprise an image processing module for processing image data captured by the camera 210.

The device 102 may comprise a communications interface 214 for communication of data to and from the device 102. For example, the device 102 may communicate with a remote device via the communications interface 214. This enables a fall detection alert message to be sent from the device 102 to a remote device (not shown in FIG. 1), which may be via a wireless connection. This remote device may for example be a mobile computing device (e.g. a tablet or smartphone) associated with a carer or relative. Alternatively the remote device may be a computing device in a remote location (e.g. a personal computer in a monitoring station). Alternatively the remote device may be a control hub in the environment 100 (e.g. a wall or table mounted control hub). The control hub may be a control hub of a system that may be monitoring system and/or may be a home automation system. The notification to the control hub is in some embodiments via wireless personal area network, e.g. a low-rate wireless personal area network.

Additionally or alternatively, the device 102 may communicate, via the communications interface 214, with one or more of the activity sensor(s) 212, the active reflected wave detector 206, and the camera 210 in embodiments in which such components are not housed in the housing 200 of the device 102.

The device 102 may comprise an output device 208 to output a fall detection alert. For example, the CPU 202 may control a visual output device (e.g. a light or a display) on device 102 to output a visual alert of the fall detection. Alternatively or additionally the CPU 202 may control an audible output device (e.g. a speaker) on device 102 to output an audible alert of the fall detection.

Figure 3:
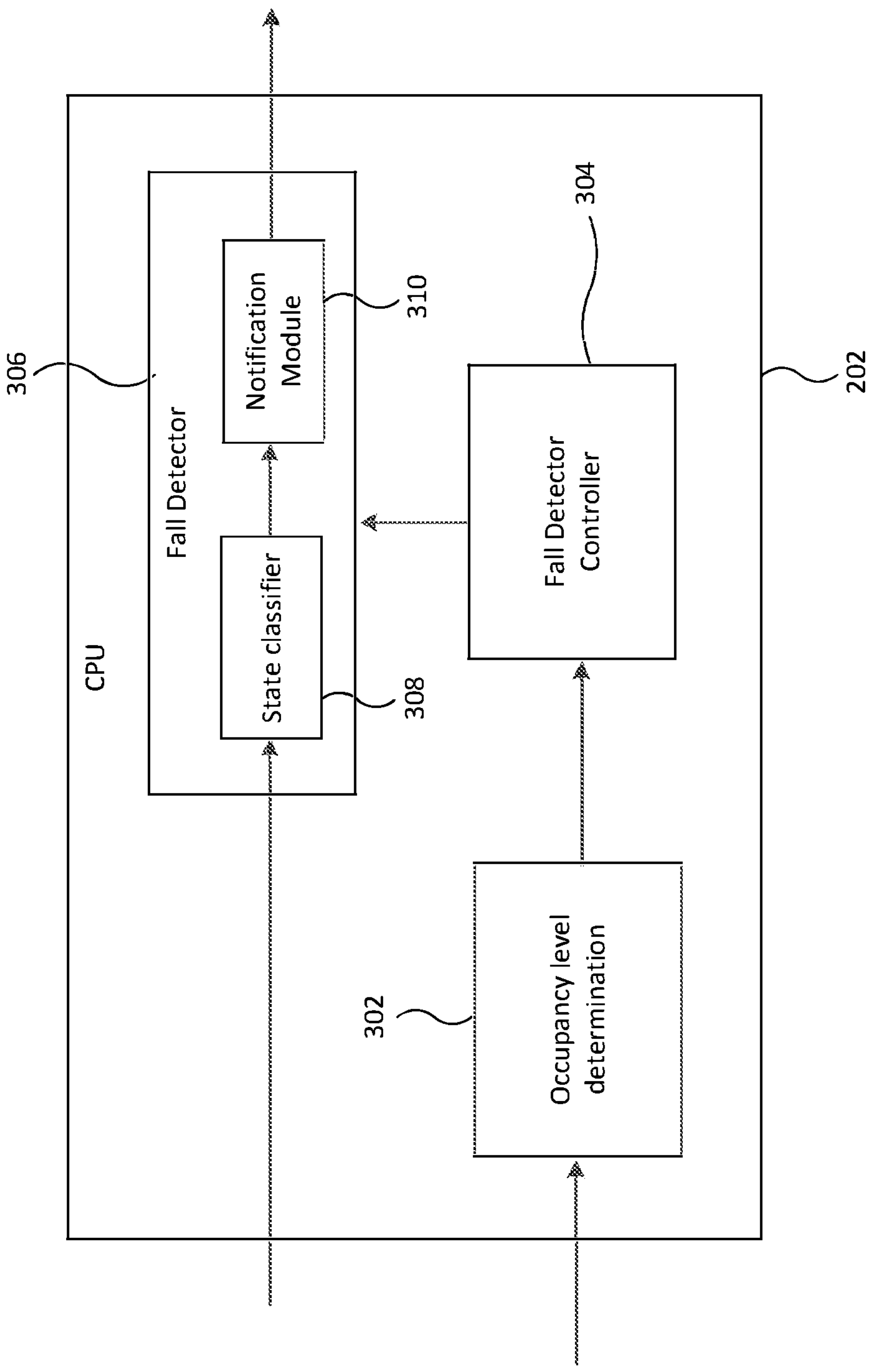
FIG. 3 is a schematic block diagram of a CPU of the device.

FIG. 3 is a schematic block diagram of the CPU 202 of the device 102. As shown in FIG. 3, the CPU 202 comprises an occupancy level determination module 302, a fall detector controller 304, and a fall detector 306. The fall detector 306 comprises a state classifier 308 and a notification module 310.

As noted above, the active reflected wave detector 206 operates to measure wave reflections from the environment by performing reflected wave measurements, otherwise referred to herein as measured wave reflection data. The state classifier 308 receives measured wave reflection data that is obtained by the active reflected wave detector 206.

For each reflected wave measurement, for a specific time in a series of time-spaced reflected wave measurements, the reflected wave measurement may include a set of one or more measurement points that make up a "point cloud", the measurement points representing reflections from respective reflection points from the environment. In embodiments, the active reflected wave detector 206 provides an output to the CPU 202 for each captured frame as a point cloud for that frame. Each point in the point cloud may be defined by a 3-dimensional spatial position from which a reflection was received, and defining a peak reflection value, and a Doppler value from that spatial position. Thus, a measurement received from a reflective object may be defined by a single point, or a cluster of points from different positions on the object, depending on its size.

In some embodiments, such as in the examples described herein, the point cloud represents only reflections from moving points of reflection, for example based on reflections from a moving target. That is, the measurement points that make up the point cloud represent reflections from respective moving reflection points in the environment. This may be achieved for example by the active reflected wave detector 206 using moving target indication (MTI). Thus, in these embodiments there must be a moving object in order for there to be reflected wave measurements from the active reflected wave detector (i.e. measured wave reflection data), other than noise Alternatively, the CPU 202 receives a point cloud from the active reflected wave detector 206 for each frame, where the point cloud has not had pre-filtering out of reflections from moving points. Preferably for such embodiments, the CPU 202 filters the received point cloud to remove points having Doppler frequencies below a threshold to thereby obtain a point cloud representing reflections only from moving reflection points. In both of these implementations, the CPU 202 accrues measured wave reflection data which corresponds to point clouds for each frame whereby each point cloud represents reflections only from moving reflection points in the environment.

In some embodiments, measured wave reflection data may comprise signals received from an array of transducers (e.g. antennas) and/or may be represented by analog or digital signals that precede a digital signal processing (dsp) component of the apparatus. For example, even in embodiments that generate a point cloud, the measured wave reflection data may be data that precedes calculation of the point cloud by the dsp component.

In other embodiments, no moving target indication (or any filtering) is used. In these implementations, the CPU 202 accrues measured wave reflection data which corresponds to point clouds for each frame whereby each point cloud can represent reflections from both static and moving reflection points in the environment.

The state classifier 308 is configured to process the measured wave reflection data to detect whether a person is in the environment and, if a person is detected, detect whether a person in the environment has fallen.

As will be described in more detail below, this need not be a two-step process i.e. of looking for a person and then classifying them. For example, the state classifier 308 may take the output of the active reflected wave detector 206 and do a classification, wherein one of the outputs of the classification is that there is no person, or in other embodiments it may only conclude that there is no person if it fails to perform a classification of a person's status.

When classifying the state of a person, the state classifier 308 may perform a determination that the person is in a fall position (i.e. a position that is consistent with them haven fallen). In embodiments of the present disclosure the determination that the person is in a fall position is used as an indicator that the person may be in need of help. Being in a position which is consistent with the person having fallen does not necessarily mean they have fallen, or have fallen such that they need help. For example, they may be on the floor for other reasons, or they may have had a minor fall from which they can quickly recover. However, if they remain in a fall position for sufficient time it may be concluded that they are sufficiently likely to have fallen to be classified by the state classifier 308 as being in a fall condition, and the device 102 may therefore take appropriate action accordingly, e.g. by sending a notification to a remote device.

In the process of determining whether a person is in a fall position, in response to the person being classified as being in a fall position, the active reflected wave detector may be deactivated. The state classifier 308 may then wait a predetermined amount of time and then reclassifies to see if the person is still in the same position, and if so, determines that there is a person in a fall condition (because they have been in a fall position for some amount of time deemed to indicate they may need help). Embodiments of the present disclosure advantageously conserve energy by switching the active reflected wave detector 206 to a lower power state (e.g. off or asleep) between the reflected wave measurements performed by the active reflected wave detector 206.

The state classifier 308 may operate in a number of different ways to perform a fall detection process:

Using Thresholds

In some embodiments, in order to detect and classify the state of a person the processes the measured wave reflections by determining one or more parameters associated with the measured wave reflections and then comparing the parameter(s) to one or more thresholds to detect and classify the state of a person.

The person may be tracked using a tracking module of the state classifier 308. The tracking module can use any known tracking algorithm. For example, the active reflected wave detector 206 may generate a plurality of detection measurements (e.g. up to 100 measurements, or in other embodiments hundreds of measurements) for a given frame. Each measurement can be taken a defined time interval apart such as 0.5, 1, 2 or 5 seconds apart. Each detection measurement may include a plurality of parameters in response to a received reflective wave signal above a given threshold. The parameters for each measurement may for example include an x and y coordinate (and z coordinate for a 3D active reflected wave detector 206), a peak reflection value, and a doppler value corresponding to the source of the received radar signal.

The data can then be processed using a clustering algorithm to group the measurements into one or more measurement clusters corresponding to a respective one or more targets. An association block may then associate a given cluster with a given previously measured target. A Kalman filter of the tracking module may then be used to determine the next position of the target based on the corresponding cluster of measurements and the prediction of the next position based on the previous position and other information e.g. the previous velocity.

From the reflected wave measurements an RCS of an object represented by a cluster of measurement points can be estimated by summing the RCS estimates of the each of the measurement points in the cluster. This RCS estimate may be used to classify the target as a human target if the RCS is within a particular range potentially relevant to humans for the frequency of the signal emitted by the active reflected wave detector 206, as the RCS of a target is frequency dependent. Taking a 77 GHz radar signal as an example, from empirical measurements, the RCS (which is frequency dependent) of an average human may be taken to be in the order of 0.5 $m^2$, or more specifically in a range between 0.1 and 0.7 $m^2$, with the value in this range for a specific person depending on the person and their orientation with respect to the radar. The RCS of human in the 57-64 GHz spectrum is similar to the 77 GHZ RCS—i.e. 0.1 and 0.7 $m^2$.

The tracking module may output values of location, velocity and/or RCS for each target, and in some embodiments also outputs acceleration and a measure of a quality of the target measurement, the latter of which is essentially to act as a noise filter. The values of position (location) and velocity (and acceleration, if used) may be provided in 2 or 3 dimensions (e.g. cartesian or polar dimensions), depending on the embodiment.

The Kalman filter tracks a target object between frames and therefore multiple frames of reflection measurement data can be used to determine a person's velocity. Three or more frames (e.g. 3-5 frames) may be required in order to determine that there is movement exceeding a movement threshold. The frames may be taken at a rate of 2 Hz, for example.

In order to classify the state of the person in the environment, the state classifier 308 may determine a height metric associated with at least one measurement of a reflection from the person conveyed in the output of the active reflected wave detector 206 and compare the height metric to at least one threshold.

The height metric may be a height of a weighted centre of the measurement points of a body or part thereof (where each measurement is weighted by the RCS estimation), and the state classifier 308 may compare this height metric to a threshold distance, D, from the floor (e.g. 30 cm).

The height metric used to classify the state of the person is not limited to being a height of a weighted centre of the measurement points of the person's body or part thereof. In another example, the height metric may be a maximum height of all of the height measurements associated with the person's body or part thereof. In another example, the height metric may be an average height (e.g. median z value) of all of the height measurements of the person's body or part thereof. In the case of using a weighted centre or average height, the "part thereof" may beneficially be a part of the body that is above the person's legs to more confidently distinguish between fall and non-fall positions.

If the height metric (e.g. weighted centre, average height and/or maximum height) is within (less than) the threshold distance, D, from the floor (e.g. 30 cm), the state classifier 308 may determine that the person in the environment is in a fall position.

In order to classify the state of the person in the environment, the state classifier 308 may determine a velocity associated with the person using the measurements of reflections that are conveyed in the output of the active reflected wave detector 206 and compare the velocity to a velocity threshold. The tracking module referred to above may output a value of velocity for the target (person in the environment). For example, the velocity may assist in classifying whether a human is present in the environment. For example, it may be concluded that no human is present if there is no detected object having a velocity within a predefined range and or having certain dynamic qualities that are characteristic of a human. The comparison between the detected velocity associated with the person and the velocity threshold can also assist with narrowing the classification down to a specific state. For example if the detected velocity associated with the person is not greater than the velocity threshold the state classifier 308 may determine that the person is not moving and is in a fall state.

In order to classify the state of the person in the environment, the state classifier 308 may determine a spatial distribution, e.g. a variance or standard deviation, of the measurements of reflections that are conveyed in the output of the active reflected wave detector 206 and compare the spatial distribution to a threshold. This may include determining a horizontal spatial distribution of the measurements of reflections that are conveyed in the output of the active reflected wave detector 206 and comparing the horizontal spatial distribution to a horizontal spatial distribution threshold. Alternatively or additionally, this may include determining a vertical spatial distribution of the measurements of reflections that are conveyed in the output of the active reflected wave detector 206 and comparing the vertical spatial distribution to a vertical spatial distribution threshold.

The comparison between the spatial distribution(s) to a threshold can assist with narrowing the classification down to a specific state. For example, if the vertical spatial distribution is less than the vertical spatial distribution threshold (low z variance) and/or the horizontal spatial distribution is greater than the horizontal spatial distribution threshold (high x-y plane variance), then the state classifier 308 can determine that the person is in a fall state. Alternatively the ratio of the horizontal spatial distribution to vertical spatial distribution may be compared with a threshold. Such a ratio being above a threshold that has a value greater than 1 may be taken to indicate that the person is in a fall state.

Using a Classifier Model

In other embodiments, in order to detect and classify the state of a person, rather than the state classifier 308 determining one or more parameters associated with the measured wave reflections and then comparing the parameter(s) to one or more thresholds, the state classifier 308 may supply the determined parameters as inputs into a trained classifier module. The trained classifier module may be trained using one or more training data sets which include reflective wave measurements and a corresponding definition of which output state the reflective wave measurements correspond to.

The received parameters may include one or more of: (i) a height metric associated with at least one reflection; (ii) a velocity associated with the person using the measurements of reflections; and (iii) a spatial distribution characterization of the measurements (e.g. one or more of a horizontal spatial distribution (e.g. a variance or equivalently a standard deviation), a vertical spatial distribution and a ratio therebetween. Additionally, RCS estimates may be used to aid in assessing whether the object being classified is in fact a human. Analysis of the wave reflections to determine whether the object is likely to be human may be performed before or after the classification, but in other embodiments it may be performed as part of the classification. Thus, the classifier may additionally receive the following parameters: (iv) a sum of RCS estimates, and in some embodiments (v) a distribution (e.g., variance or equivalently standard deviation) of RCS estimates. For example, the received parameters may be: 1. an average height (e.g. median z value); 2. a standard deviation of RCS estimates; 3. A sum of RCS estimates; and 4. a standard deviation of height(z) values.

In these embodiments the trained classifier module uses the received parameters and the training data set(s) to classify the state of the person in the environment.

It will be appreciated that this can be implemented in various ways.

The trained classifier module may be used at operation time to determine a classification score, using a method known by the person skilled in the art. The score may for example provide an indication of a likelihood or level of confidence that the received parameters correspond to a particular classifier output state. A determination of a particular classification (e.g. a fall position) may for example be based on whether a classification confidence score is greater than a threshold then the person is determined to be in that state. For example, the CPU 202 may determine that the person is in a fall state if the output of the classifier determines that there is more than a 60% likelihood (or some other predefined likelihood threshold, which may optionally be greater than 50%, or even less than 50% to be conservative/cautious) of the person being in a fall position.

It will be appreciated that it may not be necessary for the classifier module to be trained with a data set associated with a particular classifier state in order for the classifier module to classify the person as being in the particular classifier state. Consider the simple example whereby the trained classifier module is configured to indicate that the person is in one of two states (i.e. in a fall state or a non-fall state), the trained classifier module may have been trained with a data set including reflective wave measurements corresponding to a person in a non-fall state, and based on a low correlation of the received parameters to the training data set corresponding to a person in a non-fall state, the trained classifier module may be configured to indicate that the person is in a fall state.

Furthermore, as noted above, there need not be a two-step process of looking for a person and then classifying them. A trained classifier module could be used that is trained of different data that is not necessarily limited to reflections from discreet objects or from objects already identified as potentially being human. For example a classifier could be fed respective sets of training data for (i) a person is present and in a fall position; (ii) a person is present and in a non-fall position; and (iii) no person is present. The classifier may determine a classification of active reflective wave measurements based on which of the trained states it is most closely correlated with.

Any other method, known by the person skilled in the art, of training and using the classifier based on (i) the receiving parameters as exemplified above, and (i) the relevant output states may alternatively be used.

Regardless of how the state classifier 308 performs a fall detection process to detect whether a person in the environment has fallen (i.e. they are in a fall condition), if the state classifier 308 detects that a person in the environment has fallen, the notification module 310 is configured to output a fall detection alert (in absence of any control signal received from a fall detector controller 304).

The notification module 310 may output the fall detection alert via the output device 208 (e.g. a visual and/or audible alert). Alternatively or additionally, the notification module 310 may output the fall detection alert to a remote device via the interface 214.

Occupancy Dependent Fall Detection

As shown in FIG. 3, the CPU 202 comprises an occupancy level determination module 302 and a fall detector controller 304.

The occupancy level determination module 302 is configured to receive input data, and process the input data in order to determine an occupancy level indicative of how many people are present in the environment. The occupancy level may be a number of persons detected in the environment by the occupancy level determination module 302. Alternatively, the occupancy level may not be a numerical value and instead merely indicate whether: (i) no people are present in the environment, (ii) a single person is present in the environment; or (iii) multiple people are present in the environment (without specifying the exact number of people present). The occupancy level determination module 302 is further configured to supply the occupancy level to the fall detector controller 304. The fall detector controller 304 is configured to control the fall detector 306 based on the occupancy level. For example, the fall detector controller 304 may control the state classifier 308 or the notification module 310 in dependence on the occupancy level. This is described in more detail below.

The input data received by the occupancy level determination module 302 can take many different forms as will be described in more detail below.

Figure 4:
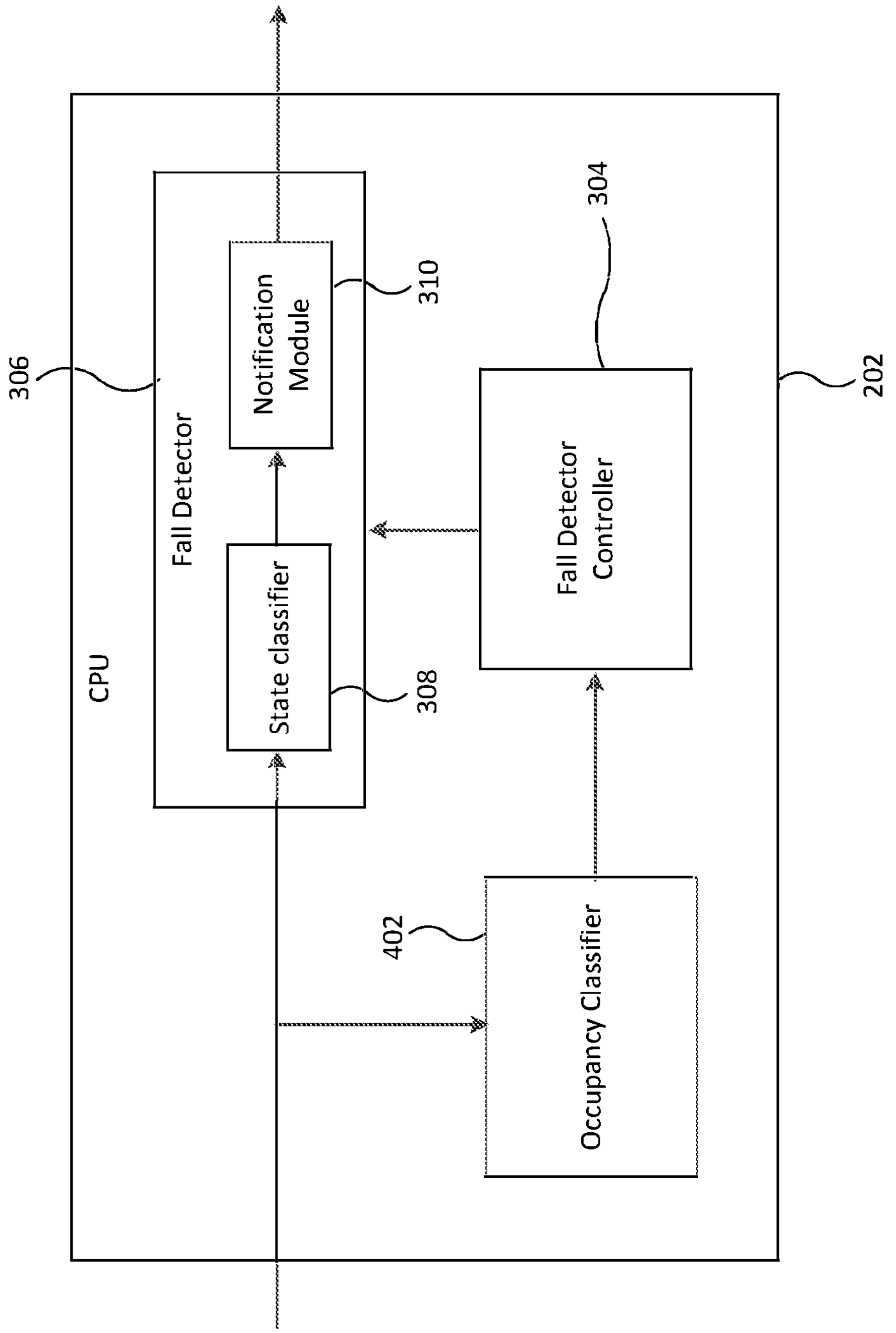
FIG. 4 is a schematic block diagram of a CPU of the device according to an embodiment of the present disclosure.

In one example, the occupancy level determination module 302 receives the measured wave reflection data that is obtained by the active reflected wave detector 206 as input data, this is illustrated in FIG. 4. Some example methods for determining occupancy level based on data from an active reflected wave detector are described herein, and these may optionally be employed in various embodiments. However, occupancy level determination techniques based on active reflected wave detector data are known in the art, and any such techniques may be used for occupancy level determination module disclosed herein.

In one exemplary embodiment, the occupancy level determination module 302 may operate as an occupancy classifier 402.

The occupancy classifier 402 is trained with a plurality of datasets (i.e. training data), the plurality of datasets comprising (i) one or more datasets of reflection data associated with an environment comprising a single person; and (ii) one or more datasets of reflection data associated with an environment comprising multiple people. For example, there may be datasets of reflection data associated with an environment comprising multiple people, e.g. various cases in which two people and three people are in an environment. In some embodiments, the plurality of datasets includes reflection data of people in an environment, a subset of one or more or all people being in fall positions; a subset of one or more or all people being in non-fall positions; and/or any or all combinations of fall and non-fall positioned people.

The trained occupancy classifier 402 is used at operation time to determine a classification score, using a method known by the person skilled in the art. The classification score may for example provide an indication of a likelihood or level of confidence that multiple persons are present in the environment. If the classification score is greater than a threshold then the trained occupancy classifier 402 determines that multiple persons are present in the environment. The trained occupancy classifier 402 may comprise a neural network. For example, the training data may be used to train a neural network. The neural network may be a deep neural network (DNN) such as a convolutional neural network (CNN), a wide neural network (WNN) a recurrent neural network (RNN), artificial neural network (ANN) and/or some other form of deep neural network architecture or combination thereof could be used.

We now refer to a process 500 performed by the CPU 202 in accordance with embodiments of the present disclosure.

At step S502, the CPU 202 controls the active reflected wave detector 206 to measure wave reflections from the environment and receives measured wave reflection data that is obtained by the active reflected wave detector.

It should be noted that when the process 500 is started, the active reflected wave detector 206 may be in a deactivated state. In the deactivated state the active reflected wave detector 206 may be turned off. Alternatively, in the deactivated state the active reflected wave detector 206 may be turned on but in a lower power consumption operating mode whereby the active reflected wave detector 206 is not operable to perform reflected wave measurements.

In these implementations, the CPU 202 is configured to use an activity sensor 212 to monitor the activity in the environment 100, and if no activity is detected for a predetermined amount of time, then the CPU 202 activates the active reflected wave detector 206 so that it is in an activated state (e.g. a higher power consumption operating mode) and operable to measure wave reflections from the environment 100.

The active reflected wave detector 206 consumes more power in an activated state (i.e. when turned on and operational) than the activity sensor 212 in an activated state. Thus using a relatively low power consuming activity sensor (e.g. a motion detector such as a PIR detector) to determine whether there is activity (e.g. movement) in the environment 100, ensures that the active reflected wave detector 206 is only fully operational when activity is no longer detected (the person has stopped moving enough to be detected by the activity sensor 212 meaning that they may have fallen, or they can't be seen by the activity sensor)

At step S504, the occupancy level determination module 302 of the CPU 202 receives input data, and processes the input data in order to determine an occupancy level indicative of how many people are present in the environment.

As noted above, the occupancy level determination module 302 may be a trained occupancy classifier 402 that determines the occupancy level based on the measured wave reflection data that is obtained by the active reflected wave detector 206.

Regardless of whether such a trained occupancy classifier 402 is employed, at step S504 the occupancy level determination module 302 may analyse the measured wave reflection data that is obtained by the active reflected wave detector 206 in order to determine the occupancy level.

In one example illustrated with reference to FIG. 6*a*, at step S504 the occupancy level determination module 302 may be configured to determine the occupancy level based on a spatial distribution (D) of reflection points conveyed in the measured wave reflection data. In particular, the occupancy level determination module 302 is configured to determine the spatial distribution (e.g. horizontal distribution) of reflection points conveyed in the measured wave reflection data, and determine the occupancy level to indicate that multiple people are present in the environment if the spatial distribution of reflection points exceeds a spatial distribution threshold.

Figure 6A:
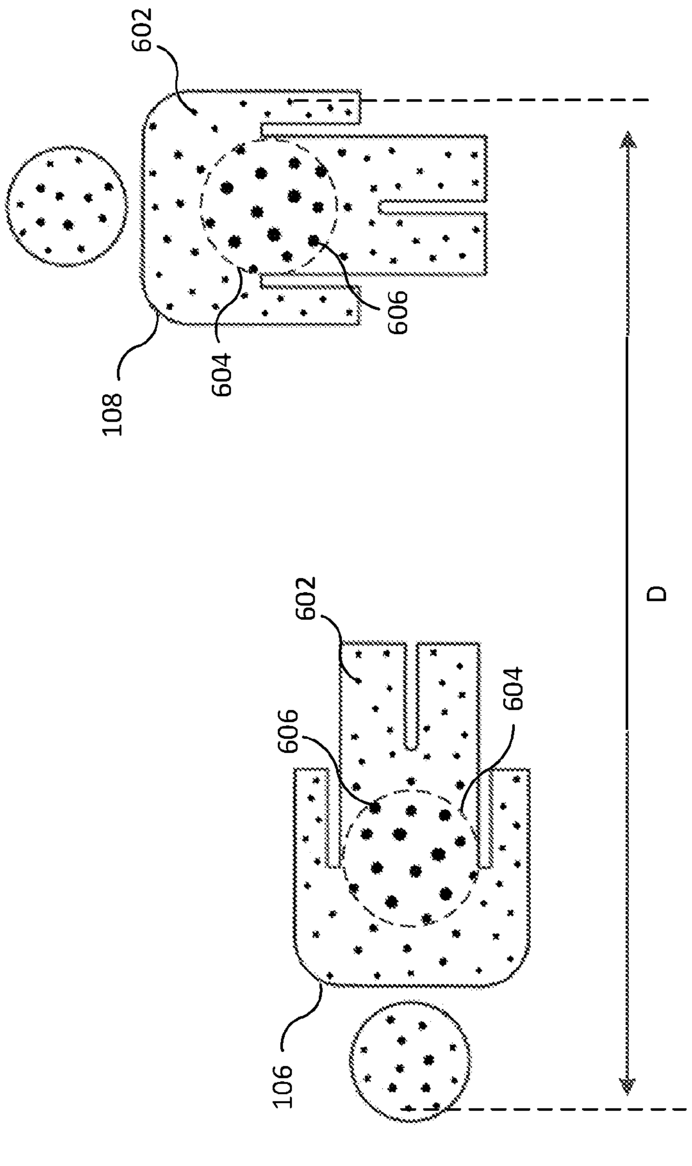
FIG. 6*a* illustrates how to determine an occupancy level indicative of how many people are present in the environment according to one embodiment of the present disclosure.

FIG. 6*a* illustrates a map of reflections from a scene of a person 106 having fallen and a person 108 in a standing position. The size of the point represents the intensity (magnitude) of energy level of the radar reflections (see larger point 606). Different parts or portions of the body reflect the emitted signal (e.g. radar) differently. For example, generally, reflections from areas of the torso 604 are stronger than reflections from the limbs. Each point represents coordinates within a bounding shape for each portion of the body. Each portion can be separately considered and have separate boundaries, e.g. the torso and the head may be designated as different portions.

As shown in FIG. 6*a*, the spatial distribution (D) of reflection points conveyed in the measured wave reflection data may relate to the maximum distance between two reflection points in the measured wave reflection data. For example, a set of moving reflection points covering a horizontal length that is more than 2 meters may be assumed to comprise more than one individual.

In another example illustrated with reference to FIG. 6*b*, at step S504 the occupancy level determination module 302 may be configured to process the measured wave reflection data using a clustering algorithm to group the measurements into one or more measurement clusters corresponding to a respective one or more targets, and determine the occupancy level based on the number of clusters. In particular, the occupancy level determination module 302 is configured to determine that multiple people are present in the environment if the clustering clusters the reflection points conveyed in the measured wave reflection data into multiple clusters.

Figure 6B:
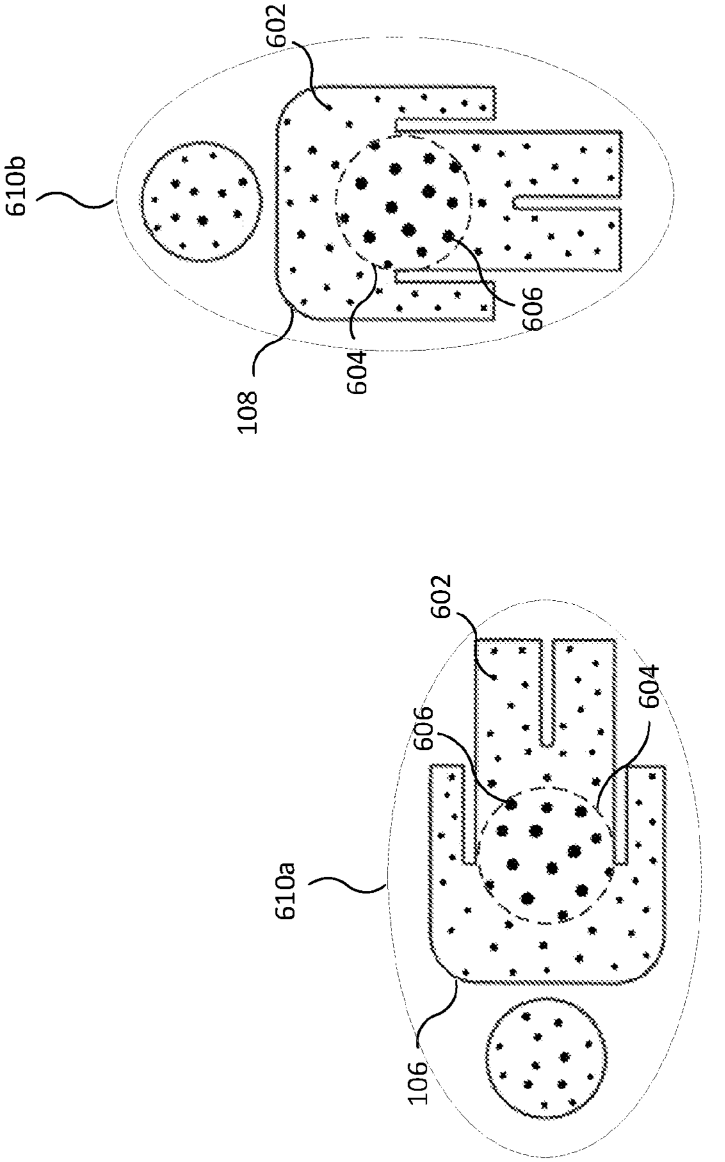
FIG. 6*b* illustrates how to determine an occupancy level indicative of how many people are present in the environment according to another embodiment of the present disclosure.

FIG. 6*b* illustrates the occupancy level determination module 302 clustering reflection points associated with the first person 106 into a first cluster 610*a*, and clustering reflection points associated with the second person 106 into a second cluster 610*b*.

Whilst FIG. 6*b* illustrates the clustering algorithm grouping measurements of a body as a whole, in other examples the clustering algorithm may cluster reflection points conveyed in the measured wave reflection data that are reflected from a part of a body (e.g. the torso 604) based on the intensity or magnitude of the reflections.

Figure 6C:
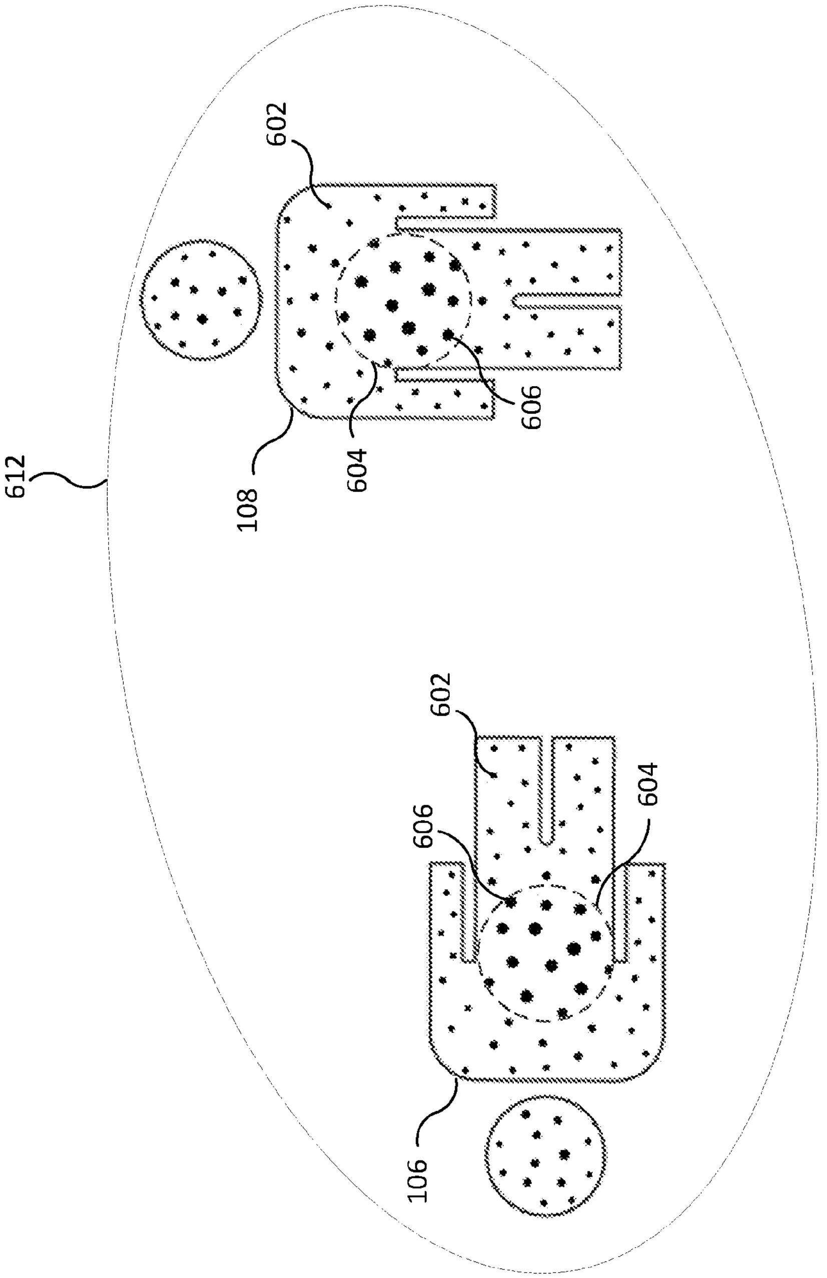
FIG. 6*c* illustrates how to determine an occupancy level indicative of how many people are present in the environment according to another embodiment of the present disclosure.

In another example illustrated with reference to FIG. 6*c*, at step S504 the occupancy level determination module 302 may be configured to process the measured wave reflection data using a clustering algorithm to group the measurements into only a single measurement cluster 612 encompassing the reflection points of the one or more targets, and determine the occupancy level based on the spatial size of this cluster 612. In particular, the occupancy level determination module 302 is configured to determine the occupancy level to indicate that multiple people are present in the environment if the size of the cluster 612 exceeds a cluster size threshold In other implementations, at step S504 the occupancy level determination module 302 docs not determine the occupancy level based on the measured wave reflection data and instead determines the occupancy level based on other input data.

In one example implementation, the CPU 202 is coupled to a first activity sensor 212 that is configured to detect activity in a first region of the environment and a second activity sensor 212 sensor that is configured to detect activity in a different, second region of the environment. That is, the second region does not overlap with the first region. The first and second regions may be different regions of an environment (e.g. different regions of the same room). Whilst the housing 200 may house both the first activity sensor 212 and the second activity sensor 212, one or both of the first activity sensor 212 and the second activity sensor 212 may be external to the device 102 and be in wireless or wired communication with the device 102, either directly or indirectly (e.g. via an intermediate device, such as via a control panel).

The occupancy level determination module 302 is configured to receive a first sensor signal from the first activity sensor which indicates whether there is activity in the first region, and a second sensor signal from the second activity sensor which indicates whether there is activity in the second region. The occupancy level determination module 302 is configured to determine the occupancy level using both the first sensor signal and the second sensor signal. In particular, if both the first sensor signal and the second sensor signal indicate that there is simultaneous activity in the respective regions being monitored, the occupancy level determination module 302 is configured to determine the occupancy level to indicate that multiple people are present in the environment. The activity may be determined to be simultaneous either by being concurrent or by being sufficiently close in time such that, given the distance between the respective regions, there can be assumed to be multiple people present. Likewise, if the activity detected by the sensor occurs within a predefined time window of an activity detected by the second sensor, it may be concluded that there are multiple occupants. As will be appreciated, the activity detection may optionally include any known means of distinguishing human activity from that if other objects, e.g. pets.

The first activity sensor may be a motion detector (e.g. a PIR detector), a vibration sensor, or an infrared sensor. Similarly, the second activity sensor may be a motion detector (e.g. a PIR detector), a vibration sensor, or an infrared sensor.

As noted above, the active reflected wave detector 206 may provide both a ranging based output and a Doppler-based output based on measuring wave reflections from the environment. In these implementations, the active reflected wave detector 206 may perform the functions of one of the activity sensors to detect motion in a region in the environment.

In another example implementation, the CPU 202 is coupled to a camera 210 (which may be housed in the housing 200 or an external device) and at step S504 the occupancy level determination module 302 controls the camera 210 to capture one or more images of the environment (represented by image data). In response, the occupancy level determination module 302 receives image data from the camera 210. The occupancy level determination module 302 then performs image processing on the received image data to determine how many people are present in the environment.

In yet another example implementation, the activity sensor(s) comprise a microphone and at step S504 the occupancy level determination module 302 controls the microphone to capture audio from the environment. In response, the occupancy level determination module 302 receives audio data from the microphone. The occupancy level determination module 302 then processes the audio data to determine how many people are present in the environment. For example, the occupancy level determination module 302 may processes the audio data to determine how many different voices are heard.

Figure 5:
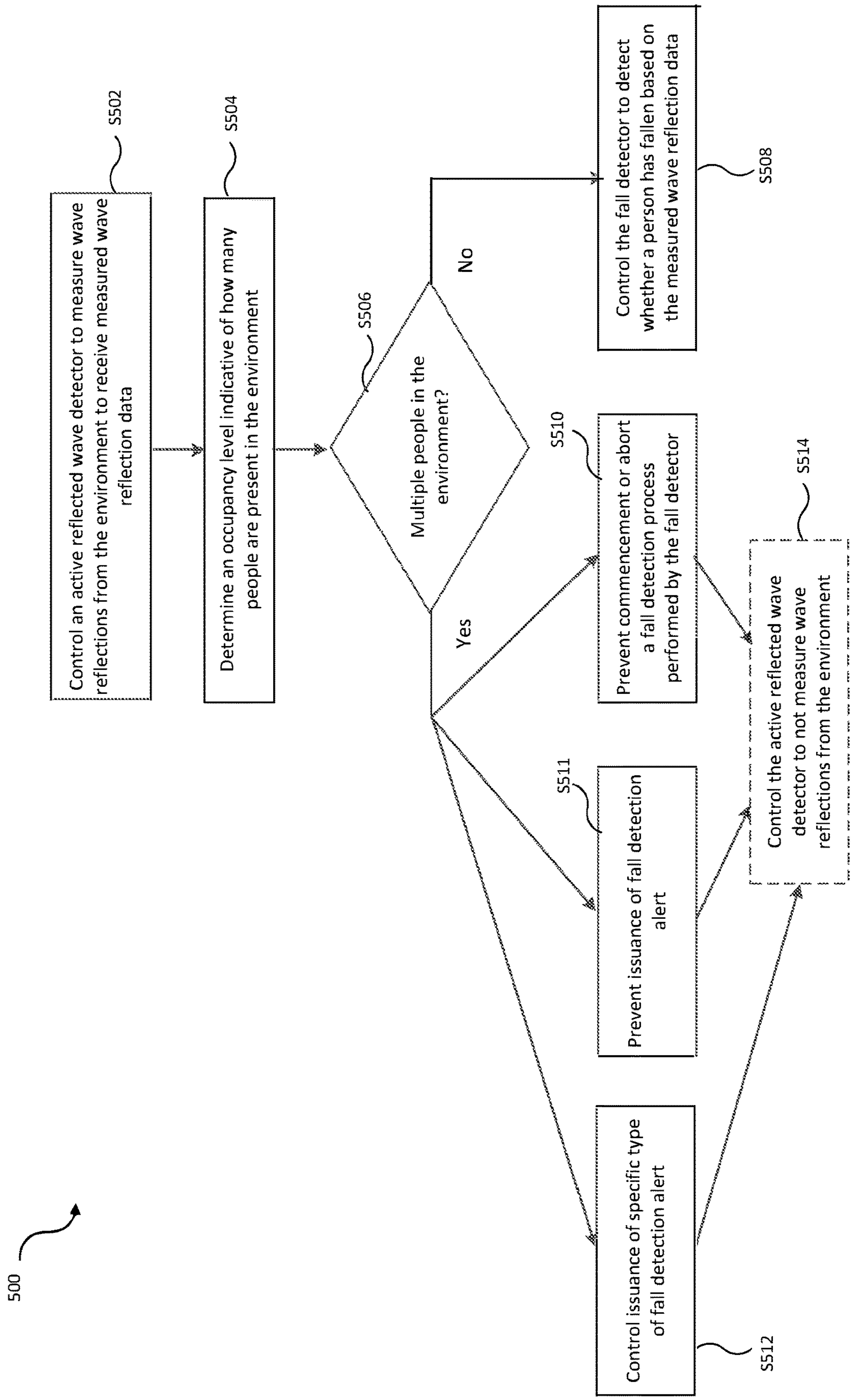
FIG. 5 illustrates a process for controlling a fall detector.

We now refer back to the process 500 illustrated in FIG. 5.

Once the occupancy level determination module 302 determines an occupancy level indicative of how many people are present in the environment, the process 500 proceeds in dependence on the occupancy level.

If at step S506, the occupancy level determination module 302 determines that there is a single person in the environment, the process proceeds to step S508 where the fall detector controller 304 controls the state classifier 308 to detect whether the single person has fallen based on the measured wave reflection data. As noted above, if the state classifier 308 detects that the person in the environment has fallen, the notification module 310 is configured to output a fall detection alert.

If at step S506, the occupancy level determination module 302 determines that there are multiple persons in the environment, the fall detector controller 304 may control operation of the fall detector 306 at step S510 to prevent commencement of a fall detection process performed by the fall detector or abort a fall detection process that is being performed by the fall detector.

In one example, if the occupancy level determination module 302 determines that there are multiple persons in the environment, at step S510 the fall detector controller 304 controls the state classifier 308 to prevent commencement of a fall detection process performed by the fall detector 306. As a result, the state classifier 308 does not process any measured wave reflection data to detect whether a person in the environment has fallen such that the state classifier 308 does not provide a final output as to whether a person in the environment has fallen. In this example, power is advantageously conserved as the fall detection process is not performed by the fall detector 306.

In another example, if the occupancy level determination module 302 determines that there are multiple persons in the environment, at step S510 the fall detector controller 304 controls the state classifier 308 to abort a fall detection process that is being performed by the fall detector. Thus the fall detection process is started but the state classifier 308 is controlled such that the fall detection process is not completed (it is aborted part-way through) and the state classifier 308 does not provide a final output as to whether a person in the environment has fallen. In this example, power is advantageously conserved as the fall detection process is not completed.

In another example, if the occupancy level determination module 302 determines that there are multiple persons in the environment, at step S511 the fall detector controller 304 controls the notification module 310 to prevent the issuance of a fall detection alert in response to the fall detector detecting that a person in the environment has fallen. Thus, the fall detection process performed by the state classifier 308 is allowed to complete, but in the event that a fall is detected, the fall detector 306 does not respond to the detected fall, by not sending any notification when it would otherwise (if only a single person was present in the environment). Preventing the issuance of a fall detection alert in response to the fall detector detecting that a person in the environment has fallen may comprise the fall detector controller 304 (*i*) controlling the notification module 310 such that a fall detection alert is not generated; or (ii) controlling the notification module 310 such that a generated fall detection alert is not transmitted to an output device 208 (e.g. a visual and/or audible alert), or to a remote device via the interface 214 . . . . In this example, power is advantageously conserved by preventing the issuance of the fall detection alert performed by the notification module 310. In this scenario, the fall detection alert is not needed because more than one another person is in the environment with the person who has fallen and it can be assumed that the one another person is aware of their condition and can take appropriate action by calling for help, making a telephone call or pushing a distress button if needed.

In another example, if the occupancy level determination module 302 determines that there are multiple persons in the environment, at step S512 the fall detector controller 304 controls the notification module 310 such that in the event that a fall is detected by the state classifier 308, the notification module 310 still issues a fall detection alert but it is of a different type of fall detection alert than if the person was in the environment alone. That is, the fall detector controller 304 controls the notification module 310 to not issue a first type of fall detection alert that the notification module 310 is configured to generate in response to the fall detector detecting that a person alone in the environment has fallen. The first type of fall detection alert may merely indicate that a fall has been detected with no information on how many people are present in the environment. Alternatively, the first type of fall detection alert may indicate that a fall has been detected and the person is alone. The fall detector controller 304 further controls the notification module 310 to issue a second type of fall detection alert in response to the fall detector detecting that a person in the environment has fallen, the second type of fall detection alert indicative that multiple people are present in the environment. Taking the example whereby the notification module 310 outputs the fall detection alert to a remote device (e.g. a personal computer in a monitoring station) via the interface 214, this enables the monitoring station to respond differently given that the person who has fallen is not alone. For example, an attendant at the monitoring station may seek to speak to the other present person before, or simultaneously with, dispatching an ambulance.

As shown in FIG. 5, in the event that the occupancy level indicates that multiple people are present in the environment, at step S514 the CPU 202 may be configured to deactivate the active reflected wave detector 206 to provide further power savings.

If at step S506, the occupancy level determination module 302 determines that there are no people present in the environment the fall detector controller 304 may control the state classifier 308 to prevent commencement of a fall detection process performed by the fall detector 306 or abort a fall detection process that is being performed by the fall detector 306 . . . . Thus power is advantageously conserved as the fall detection process is not started or completed.

Additionally or alternatively, if there are no people present in the environment the CPU 202 may be configured to deactivate the active reflected wave detector 206 to provide further power savings.

The term "module," as used herein generally represent software, firmware, hardware, or a combination thereof. In the case of a software implementation, the module represents program code that performs specified tasks when executed on a processor (e.g. CPU or CPUs). The program code can be stored in one or more computer readable memory devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method comprising:

controlling an active reflected wave detector to measure wave reflections from an environment to receive measured wave reflection data that is obtained by the active reflected wave detector;

determining an occupancy level indicative of how many people are present in the environment; and controlling, in dependence on the occupancy level, a fall detector that is operable to detect whether a person in the environment has fallen based on the measured wave reflection data, wherein if the occupancy level indicates that only a single person is present in the environment, the method comprises controlling the fall detector to detect whether the single person has fallen based on the measured wave reflection data, wherein the controlling comprises, if the occupancy level indicates that multiple people are present in the environment, controlling the fall detector to any of:

prevent commencement of a fall detection process performed by the fall detector;

abort a fall detection process performed by the fall detector; or prevent the issuance of a fall detection alert in response to the fall detector detecting that a person in the environment has fallen.

2. The computer implemented method of claim 1, wherein the first type of fall detection alert indicates that a single people is present in the environment, or provides no information on how many people are present in the environment.

3. The computer implemented method of claim 1, wherein said determining the occupancy level is based on the measured wave reflection data.

4. The computer implemented method of claim 3, wherein said determining the occupancy level is based on a spatial distribution of reflection points conveyed in the measured wave reflection data.

5. The computer implemented method of claim 1, further comprising:

receiving a first sensor signal from a first activity sensor configured to detect activity in a first region of the environment;

receiving a second sensor signal from a second activity sensor configured to detect activity in a second region of the environment that does not overlap with the first region; and determining the occupancy level using both the first sensor signal and the second sensor signal.

6. The computer implemented method of claim 5, wherein at least one of the first activity sensor and the second activity sensor is a motion detector.

7. The computer implemented method of claim 1, wherein if the occupancy level indicates that multiple people are present in the environment, the method comprises controlling the active reflected wave detector to operate in an operating mode in which it does not measure wave reflections from the environment.

8. The computer implemented method of claim 1, wherein said controlling the active reflected wave detector to measure wave reflections from the environment is performed in response to detecting motion in the environment based on receiving motion detection data from a motion detector.

9. A non-transitory computer-readable storage medium comprising instructions which, when executed by a processor of a fall detection device, cause the processor to:

control an active reflected wave detector to measure wave reflections from an environment to receive measured wave reflection data that is obtained by the active reflected wave detector;

determine an occupancy level indicative of how many people are present in the environment; and control, in dependence on the occupancy level, a fall detector that is operable to detect whether a person in the environment has fallen based on the measured wave reflection data, wherein if the occupancy level indicates that only a single person is present in the environment, the method comprises controlling the fall detector to detect whether the single person has fallen based on the measured wave reflection data, wherein the control comprises, if the occupancy level indicates that multiple people are present in the environment, controlling the fall detector to any of:

prevent commencement of a fall detection process performed by the fall detector;

abort a fall detection process performed by the fall detector; or prevent the issuance of a fall detection alert in response to the fall detector detecting that a person in the environment has fallen.

10. The non-transitory computer-readable storage medium of claim 9, wherein the control comprises, if the occupancy level indicates that multiple people are present in the environment, controlling the active reflected wave detector to operate in an operating mode in which it does not measure wave reflections from the environment.

11. A fall detection device comprising:

a processor, wherein the processor is configured to:

control an active reflected wave detector to measure wave reflections from an environment to receive measured wave reflection data that is obtained by the active reflected wave detector;

determine an occupancy level indicative of how many people are present in the environment; and control, in dependence on the occupancy level, a fall detector that is operable to detect whether a person in the environment has fallen based on the measured wave reflection data, wherein if the occupancy level indicates that only a single person is present in the environment, the processor is configured to control the fall detector to detect whether the single person has fallen based on the measured wave reflection data, wherein the control comprises, if the occupancy level indicates that multiple people are present in the environment, controlling the fall detector to:

prevent commencement of a fall detection process performed by the fall detector;

abort a fall detection process performed by the fall detector; or prevent the issuance of a fall detection alert in response to the fall detector detecting that a person in the environment has fallen.

12. The fall detection device of claim 1, wherein if the occupancy level indicates that multiple people are present in the environment, the processor is configured to control the active reflected wave detector to operate in an operating mode in which it does not measure wave reflections from the environment.

13. The fall detection device of claim 11, wherein the occupancy level is determined based on the measured wave reflection data.

14. The fall detection device of claim 11, wherein the processor is configured to:

receive a first sensor signal from a first activity sensor configured to detect activity in a first region of the environment;

receive a second sensor signal from a second activity sensor configured to detect activity in a second region of the environment that does not overlap with the first region; and determine the occupancy level using both the first sensor signal and the second sensor signal.

15. The fall detection device of claim 14, wherein at least one of the first activity sensor and the second activity sensor is a motion detector.

16. A computer implemented method comprising:

controlling an active reflected wave detector to measure wave reflections from an environment to receive measured wave reflection data that is obtained by the active reflected wave detector;

determining an occupancy level indicative of how many people are present in the environment; and controlling, in dependence on the occupancy level, a fall detector that is operable to detect whether a person in the environment has fallen based on the measured wave reflection data, wherein if the occupancy level indicates that only a single person is present in the environment, the method comprises controlling the fall detector to detect whether the single person has fallen based on the measured wave reflection data, wherein the controlling comprises controlling the fall detector to:

issue a first type of fall detection alert in response to the fall detector detecting that a person in the environment has fallen, and issue a second type of fall detection alert, different to the first type of fall detection alert, if the occupancy level indicates that multiple people are present in the environment and the fall detector detects that a person in the environment has fallen.

17. A fall detection device comprising:

a processor, wherein the processor is configured to:

control an active reflected wave detector to measure wave reflections from an environment to receive measured wave reflection data that is obtained by the active reflected wave detector;

determine an occupancy level indicative of how many people are present in the environment; and control, in dependence on the occupancy level, a fall detector that is operable to detect whether a person in the environment has fallen based on the measured wave reflection data, wherein if the occupancy level indicates that only a single person is present in the environment, the processor is configured to control the fall detector to detect whether the single person has fallen based on the measured wave reflection data, wherein the control comprises controlling the fall detector to:

issue a first type of fall detection alert in response to the fall detector detecting that a person in the environment has fallen, and issue a second type of fall detection alert, different to the first type of fall detection alert, if the occupancy level indicates that multiple people are present in the environment and the fall detector detects that a person in the environment has fallen.

18. A non-transitory computer-readable storage medium comprising instructions which, when executed by a processor of a fall detection device, cause the processor to:

control an active reflected wave detector to measure wave reflections from an environment to receive measured wave reflection data that is obtained by the active reflected wave detector;

determine an occupancy level indicative of how many people are present in the environment; and control, in dependence on the occupancy level, a fall detector that is operable to detect whether a person in the environment has fallen based on the measured wave reflection data, wherein if the occupancy level indicates that only a single person is present in the environment, the method comprises controlling the fall detector to detect whether the single person has fallen based on the measured wave reflection data, wherein the control comprises controlling the fall detector to:

issue a first type of fall detection alert in response to the fall detector detecting that a person in the environment has fallen, and issue a second type of fall detection alert, different to the first type of fall detection alert, if the occupancy level indicates that multiple people are present in the environment and the fall detector detects that a person in the environment has fallen.

* * * * *